US011929958B2

(12) United States Patent
Ren et al.

(10) Patent No.: US 11,929,958 B2
(45) Date of Patent: Mar. 12, 2024

(54) REFERENCE SIGNAL TRANSMISSION IN A REMOTE INTERFERENCE MANAGEMENT SCENARIO

(71) Applicant: QUALCOMM Incorporated, San Diego, CA (US)

(72) Inventors: Yuwei Ren, Beijing (CN); Chao Wei, Beijing (CN); Yiqing Cao, Beijing (CN); Huilin Xu, Temecula, CA (US); Yu Zhang, Beijing (CN); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/284,315

(22) PCT Filed: Oct. 12, 2018

(86) PCT No.: PCT/CN2018/109997
§ 371 (c)(1),
(2) Date: Apr. 9, 2021

(87) PCT Pub. No.: WO2020/073304
PCT Pub. Date: Apr. 16, 2020

(65) Prior Publication Data
US 2021/0385048 A1    Dec. 9, 2021

(51) Int. Cl.
*H04L 5/00* (2006.01)
*H04B 17/345* (2015.01)
*H04B 17/382* (2015.01)

(52) U.S. Cl.
CPC ......... *H04L 5/0073* (2013.01); *H04B 17/345* (2015.01); *H04B 17/382* (2015.01);
(Continued)

(58) Field of Classification Search
CPC ... H04L 5/0073; H04L 5/0048; H04L 5/0062; H04L 5/0091; H04B 17/345;
(Continued)

(56) References Cited

U.S. PATENT DOCUMENTS

2015/0201421 A1    7/2015  Park et al.
2015/0349902 A1*  12/2015  Moulsley ............. H04B 7/0413
                                                      370/252
(Continued)

FOREIGN PATENT DOCUMENTS

CN    103024755 A    4/2013
CN    108243444 A    7/2018
(Continued)

OTHER PUBLICATIONS

International Search Report and Written Opinion—PCT/CN2018/109997—ISA/EPO—dated Jul. 15, 2019.
(Continued)

*Primary Examiner* — Quoc Thai N Vu
(74) *Attorney, Agent, or Firm* — Sevan Savsa; Harrity & Harrity, LLP

(57) ABSTRACT

Various aspects of the present disclosure generally relate to wireless communication. In some aspects, a base station may detect interference, in a remote interference management (RIM) scenario, in a set of sub-bands of a plurality of sub-bands of a bandwidth portion. The base station may transmit, to identify the set of sub-bands in which interference is detected, a set of reference signals configured to indicate the set of sub-bands in which the interference is detected. Numerous other aspects are provided.

59 Claims, 9 Drawing Sheets

(52) U.S. Cl.
CPC .......... *H04L 5/0048* (2013.01); *H04L 5/0062* (2013.01); *H04L 5/0091* (2013.01)

(58) Field of Classification Search
CPC .. H04B 17/382; H04W 72/082; H04W 88/08; H04W 24/02; H04W 24/08; H04W 28/0236; H04W 72/541; H04J 11/0056; H04J 11/005

See application file for complete search history.

(56) References Cited

U.S. PATENT DOCUMENTS

| | | | | |
|---|---|---|---|---|
| 2018/0270039 | A1* | 9/2018 | Zhang | H04W 16/10 |
| 2021/0321417 | A1* | 10/2021 | Kim | H04L 5/0048 |

FOREIGN PATENT DOCUMENTS

| | | |
|---|---|---|
| WO | WO-2016024834 A1 | 2/2016 |
| WO | 2017071390 A1 | 5/2017 |

OTHER PUBLICATIONS

LG Electronics: "Discussions on Procedure for NR RIM Support", R1-1808530; 3GPP TSG-RAN WG1 Meeting #94; Gothenburg, Sweden, Aug. 20-24, 2018, Aug. 24, 2018 (Aug. 24, 2018), pp. 1-5, Section 2, Sections 1-2.

Nokia et al., "Remote Interference Management for NR", R1-1809221; 3GPP TSG-RAN WG1 Meeting #94; Aug. 24, 2018 (Aug. 24, 2018), 4 Pages, Sections 2 and 3.

ZTE: Consideration on RIM Framework and Mechanisms for Improving Network Robustness, R1-1808325; 3GPP TSG-RAN WG1 Meeting #94; Aug. 24, 2018 (Aug. 24, 2018), pp. 1-7, Section 4.

CMCC: "Discussion on RS Design for Rim", 3GPP Draft, 3GPP Tsg Ran WG1 Meeting #94bis, R1-1811042, 3rd Generation Partnership Project (3GPP), Mobile Competence Centre, 650, Route Des Lucioles, F-06921 Sophia-Antipolis Cedex, France, vol. RAN WG1 Sep. 29, 2018 (Sep. 29, 2018), XP051518444, pp. 1-14, Retrieved from the Internet: URL: http://www.3gpp.org/ftp/tsg%5Fran/WG1%5FRL1/TSGR1%5F94b/Docs/R1%2D1811042%2Ezip. Section 3.4, 3.5.

CMCC: "Updated Summary for NR-RIM", 3GPP Draft, 3GPP TSG RAN WG1 Meeting #94bis, R1-1812025—Updated Summary for NR RIM, 3rd Generation Partnership Project (3GPP), Mobile Competence Centre, 650, Route Des Lucioles, F-06921 Sophia-Antipolis Cedex, France, vol. Ran WG1, No. Chengdu, China, Oct. 8, 2018-Oct. 12, 2018 Oct. 11, 2018 (Oct. 11, 2018), XP051519348, 36 Pages, Retrieved from the Internet: URL: http://www.3gpp.org/ftp/tsg%5Fran/WG1%5FRL1/TSGR1%5F94b/Docs/R1%2D1812025%2Ezip [retrieved on Oct. 11, 2018], Section 2.1.1, 2.3.3, 2.3.7, 2.4.2, 2.4.4.

Ericsson: "On Mechanism for Identifying Strong gNB Interferers", 3GPP Draft, 3GPP TSG-RAN WG1 Meeting #94, Tdoc R1-1808823 On Mechanisms for Identifying Strong gNB Interferers, 3rd Generation Partnership Project (3GPP), Mobile Competence Centre, 650, Route Des Lucioles, F-06921 Sophia-Antipolis CE, vol. RAN WG1, No. Goteborg, Sweden, Aug. 20, 2018-Aug. 24, 2018 Aug. 10, 2018 (Aug. 10, 2018), XP051516196, 6 Pages, Retrieved from the Internet: URL: http://www.3gpp.org/ftp/tsg%5Fran/WG1%5FRL1/TSGR1%5F94/Docs/R1%2D1808823%2Ezip [retrieved on Aug. 10, 2018] Section 4.2, paragraphs [0001], [0002], section 4.2.

Intel Corporation: "Mechanism for Identifying Remote gNB Interference", 3GPP Draft, 3GPP TSG RAN WG1 Meeting #94, R1-1808704, 3rd Generation Partnership Project (3GPP), Mobile Competence Centre, 650, Route Des Lucioles, F-06921 Sophia-Antipolis Cedex, France, vol. Ran WG1, No. Gothenburg, Sweden, Aug. 20, 2018-Aug. 24, 2018 Aug. 11, 2018 (Aug. 11, 2018), XP051516079, 3 Pages, Retrieved from the Internet: URL: http://www.3gpp.org/ftp/tsg%5Fran/WG1%5FRL1/TSGR1%5F94/Docs/R1%2D1808704%2Ezip [retrieved on Aug. 11, 2018] the whole document.

LG Electronics: "Discussion on Mechanism for NR RIM Support", 3GPP Draft, 3GPP TSG RAN WG1 Meeting #94bis, R1-1810291, 3rd Generation Partnership Project (3GPP), Mobile Competence Centre, 650, Route Des Lucioles, F-06921 Sophia-Antipolis Cedex, France, Sep. 29, 2018 (Sep. 29, 2018), XP051517705, pp. 1-11, Retrieved from the Internet: URL: http://www.3gpp.org/ftp/tsg%5Fran/WG1%5FRL1/TSGR1%5F94b/Docs/R1%2D1810291%2Ezip. Sections 1-4, Section 3.

Supplementary European Search Report—EP18936639—Search Authority—The Hague—dated Apr. 25, 2022.

* cited by examiner

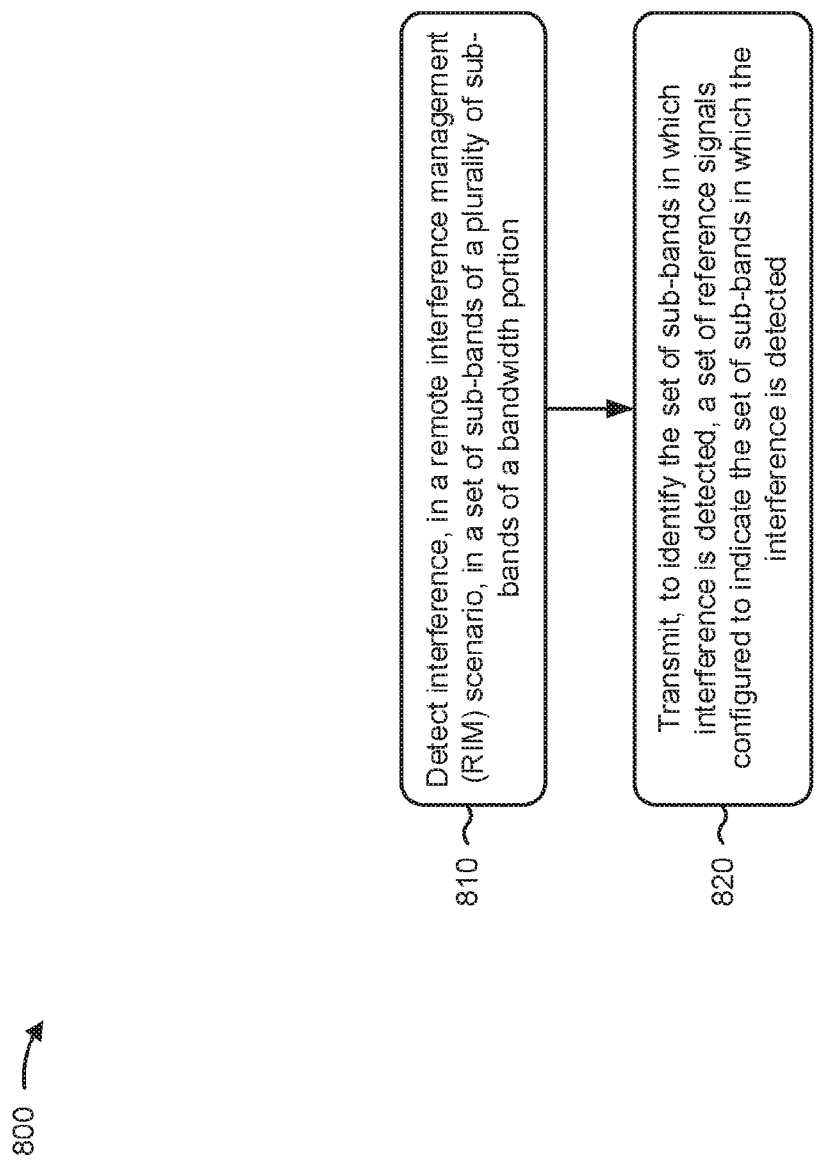

REFERENCE SIGNAL TRANSMISSION IN A REMOTE INTERFERENCE MANAGEMENT SCENARIO

CROSS-REFERENCE TO RELATED APPLICATION

This application is a 371 national stage of PCT Application No. PCT/CN2018/109997 filed on Oct. 12, 2018, entitled "REFERENCE SIGNAL TRANSMISSION IN A REMOTE INTERFERENCE MANAGEMENT SCENARIO," which is hereby expressly incorporated by reference herein.

FIELD OF THE DISCLOSURE

Aspects of the present disclosure generally relate to wireless communication, and more particularly to techniques and apparatuses for reference signal transmission in a remote interference management scenario.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP), NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include detecting interference, in a remote interference management (RIM) scenario, in a set of sub-bands of a plurality of sub-bands of a bandwidth portion. The method may include transmitting, to identify the set of sub-bands in which interference is detected, a set of reference signals configured to indicate the set of sub-bands in which the interference is detected.

In some aspects, a base station for wireless communication may include memory and one or more processors operatively coupled to the memory. The memory and the one or more processors may be configured to detect interference, in a remote interference management (RIM) scenario, in a set of sub-bands of a plurality of sub-bands of a bandwidth portion. The memory and the one or more processors may be configured to transmit, to identify the set of sub-bands in which interference is detected, a set of reference signals configured to indicate the set of sub-bands in which the interference is detected.

In some aspects, a non-transitory computer-readable medium may store one or more instructions for wireless communication. The one or more instructions, when executed by one or more processors of a base station, may cause the one or more processors to detect interference, in a remote interference management (RIM) scenario, in a set of sub-bands of a plurality of sub-bands of a bandwidth portion. The one or more instructions, when executed by one or more processors of a base station, may cause the one or more processors to transmit, to identify the set of sub-bands in which interference is detected, a set of reference signals configured to indicate the set of sub-bands in which the interference is detected.

In some aspects, an apparatus for wireless communication may include means for detecting interference, in a remote interference management (RIM) scenario, in a set of sub-bands of a plurality of sub-bands of a bandwidth portion. The apparatus may include means for transmitting, to identify the set of sub-bands in which interference is detected, a set of reference signals configured to indicate the set of sub-bands in which the interference is detected.

Aspects generally include a method, apparatus, system, computer program product, non-transitory computer-readable medium, user equipment, base station, victim base station, aggressor base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
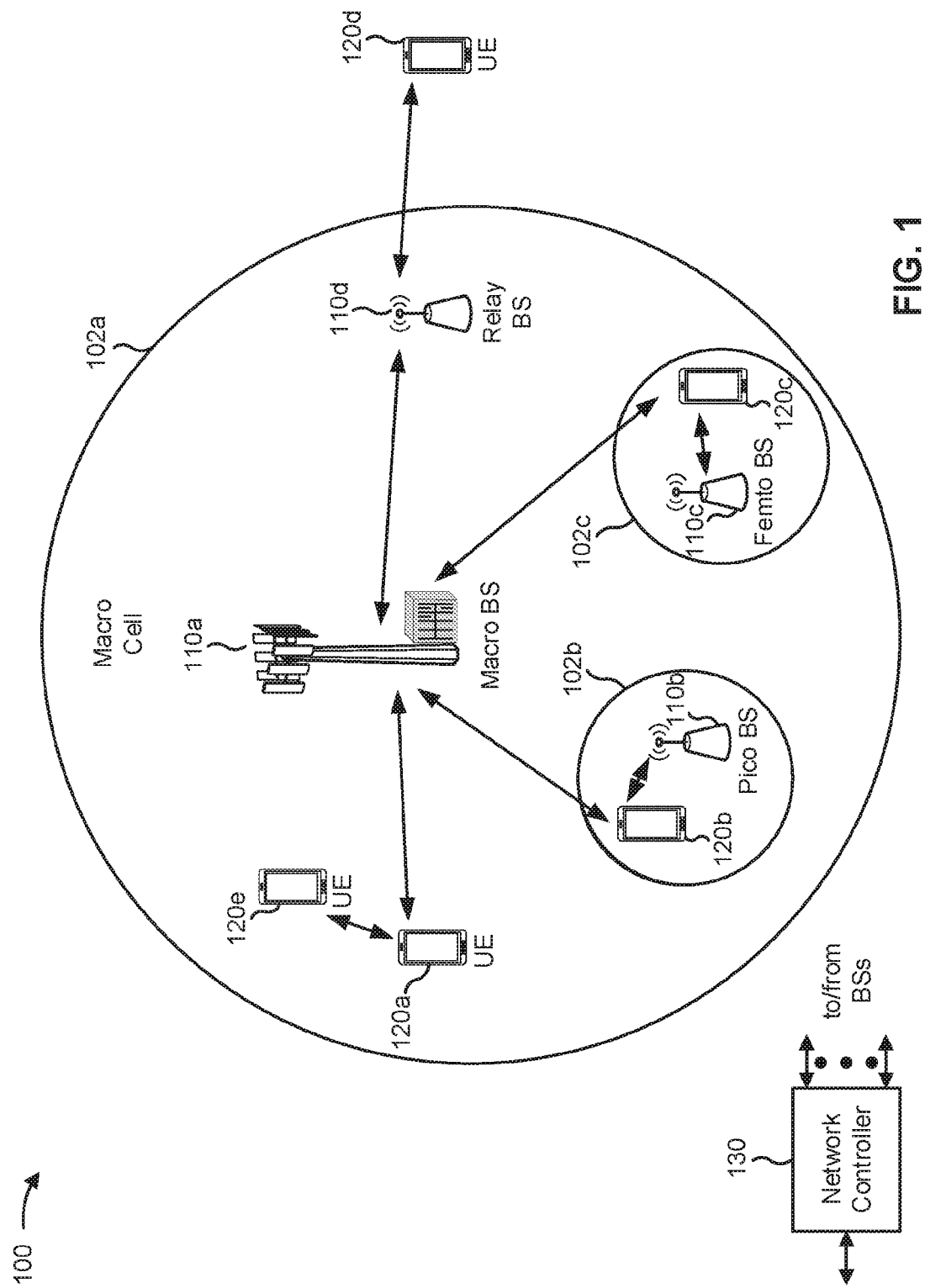
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs)) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e,g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internee of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
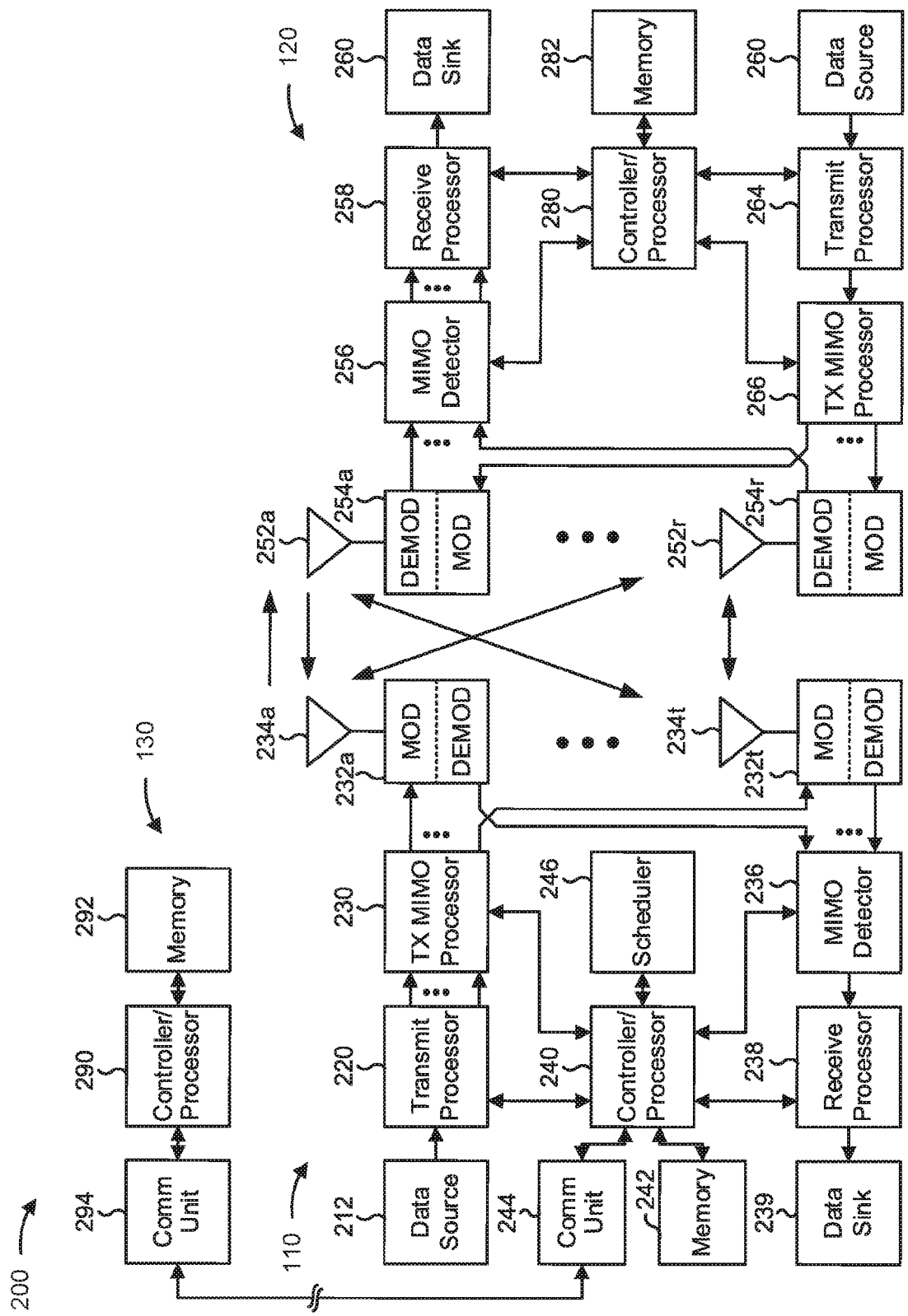
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODS) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRQ), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signal transmission in a remote interference management scenario, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for detecting interference, in a remote interference management (RIM) scenario, in a set of sub-bands of a plurality of sub-bands of a bandwidth portion, means for transmitting, to identify the set of sub-bands in which interference is detected, a set of reference signals configured to indicate the set of sub-bands in which the interference is detected, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
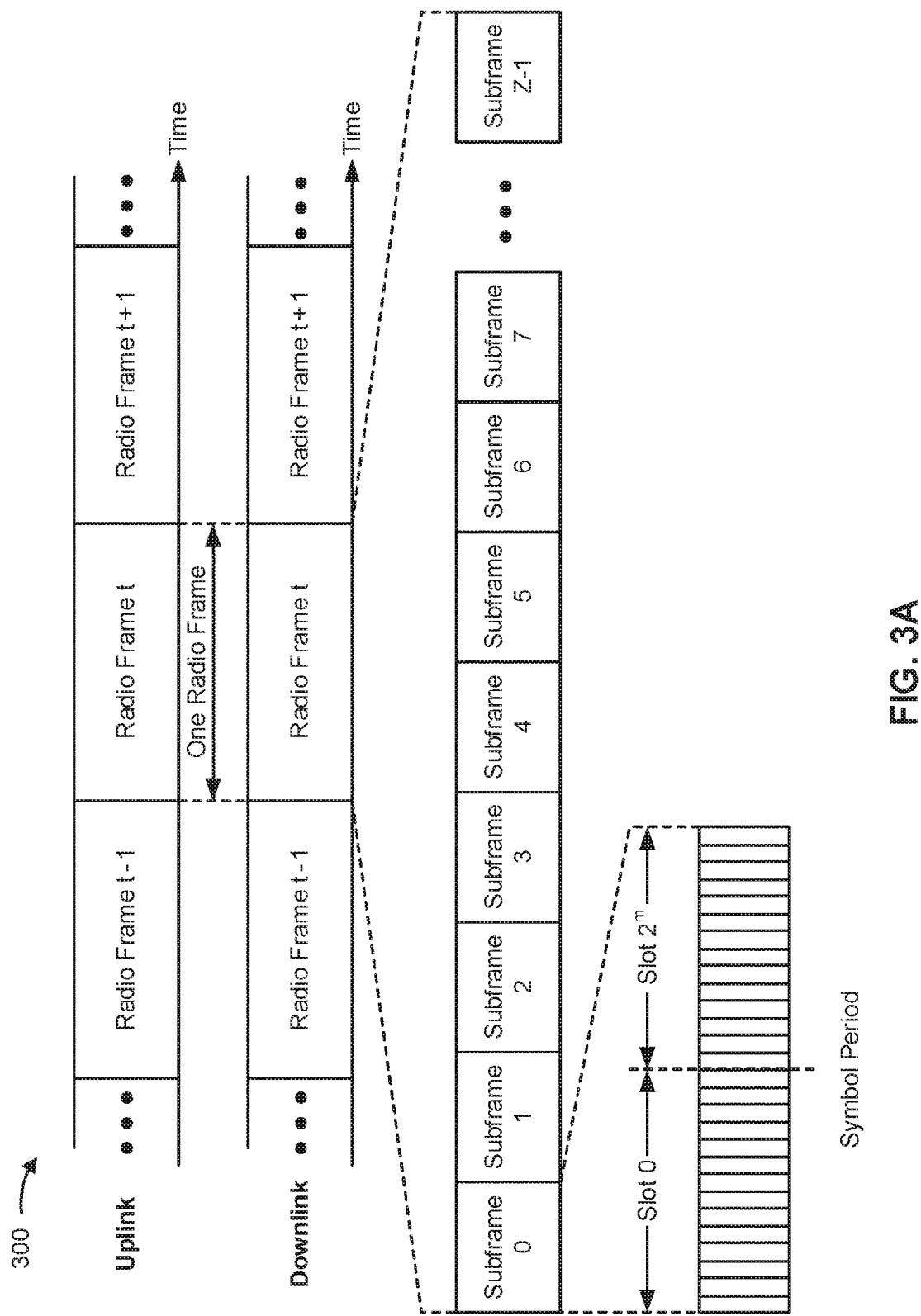
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1ms) and may include a set of slots (e.g., $2^m$ slots per subframe are shown in FIG. 3A, where in is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
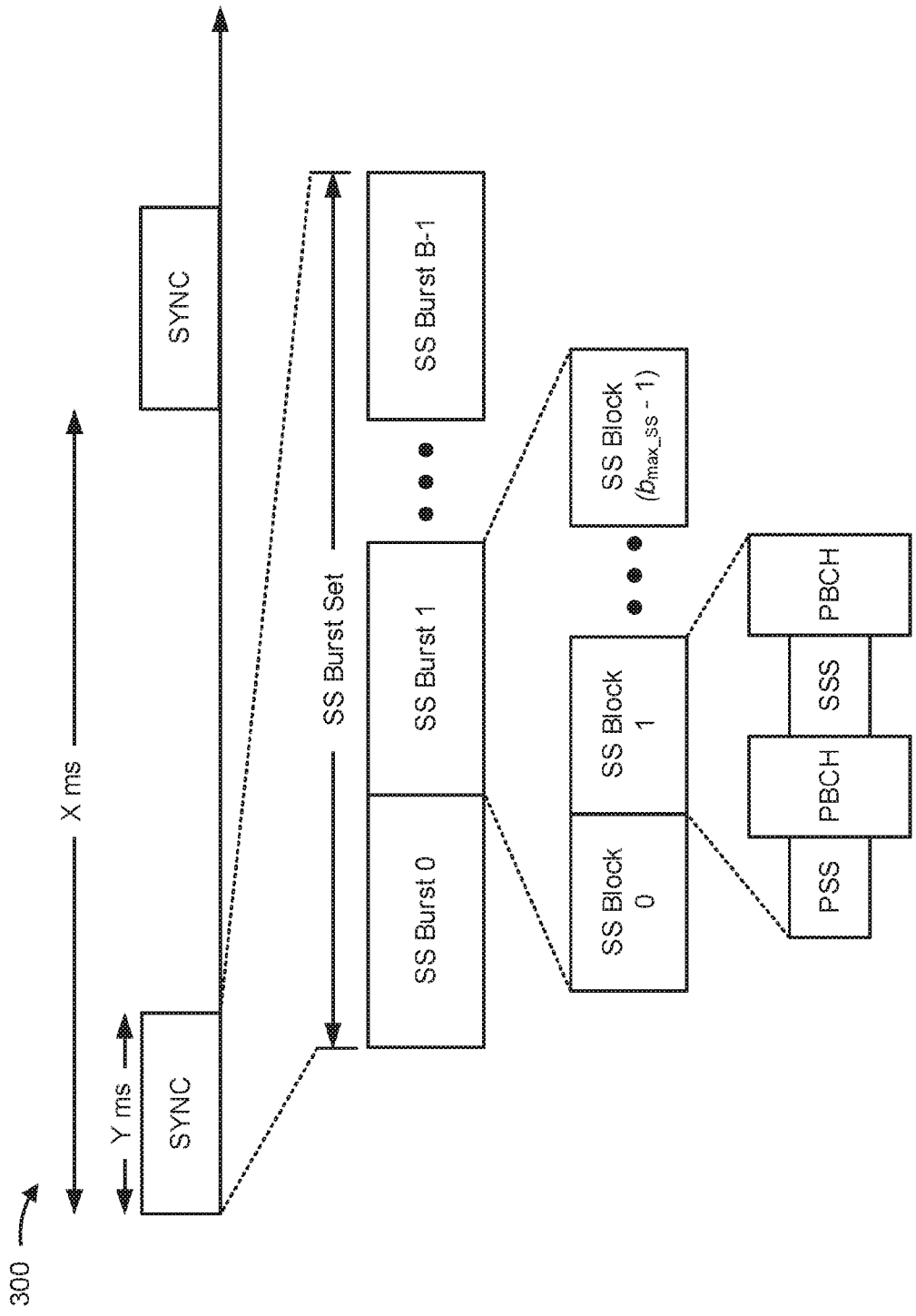
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B, in some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. Time base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above. FIGS. 3A and 3B are provided as examples. Other examples are possible and may differ from what was described with regard to FIGS. 3A and 3B.

Figure 4:
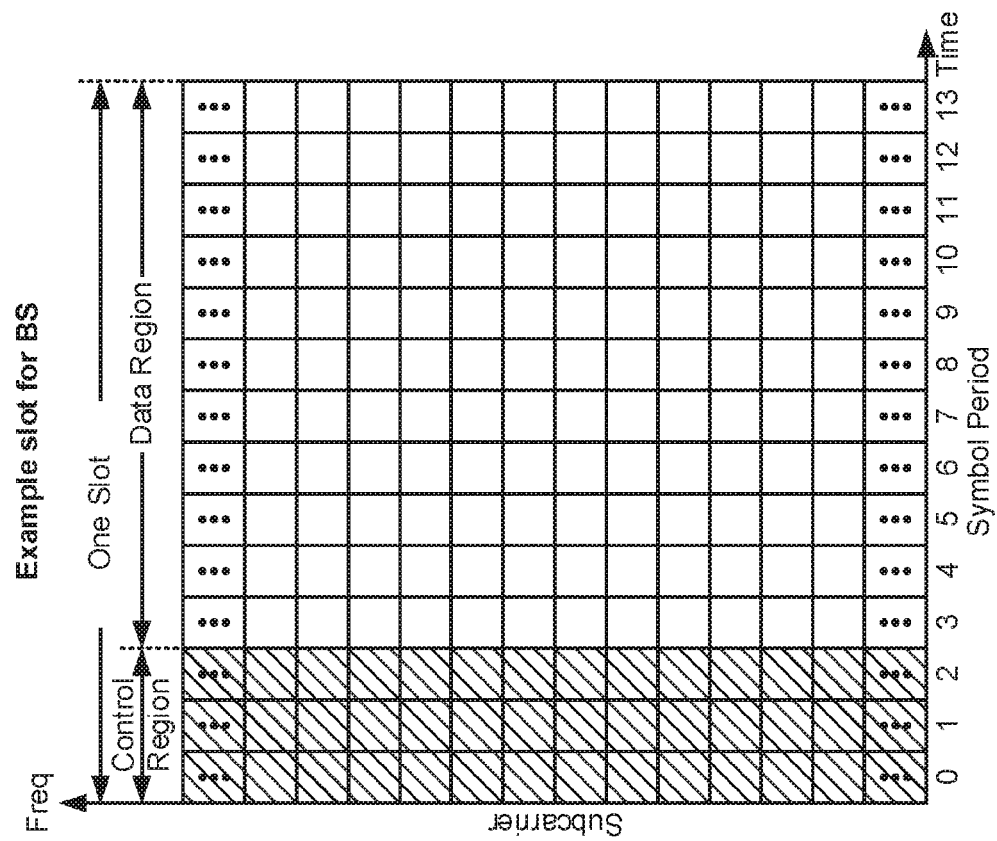
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL, may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
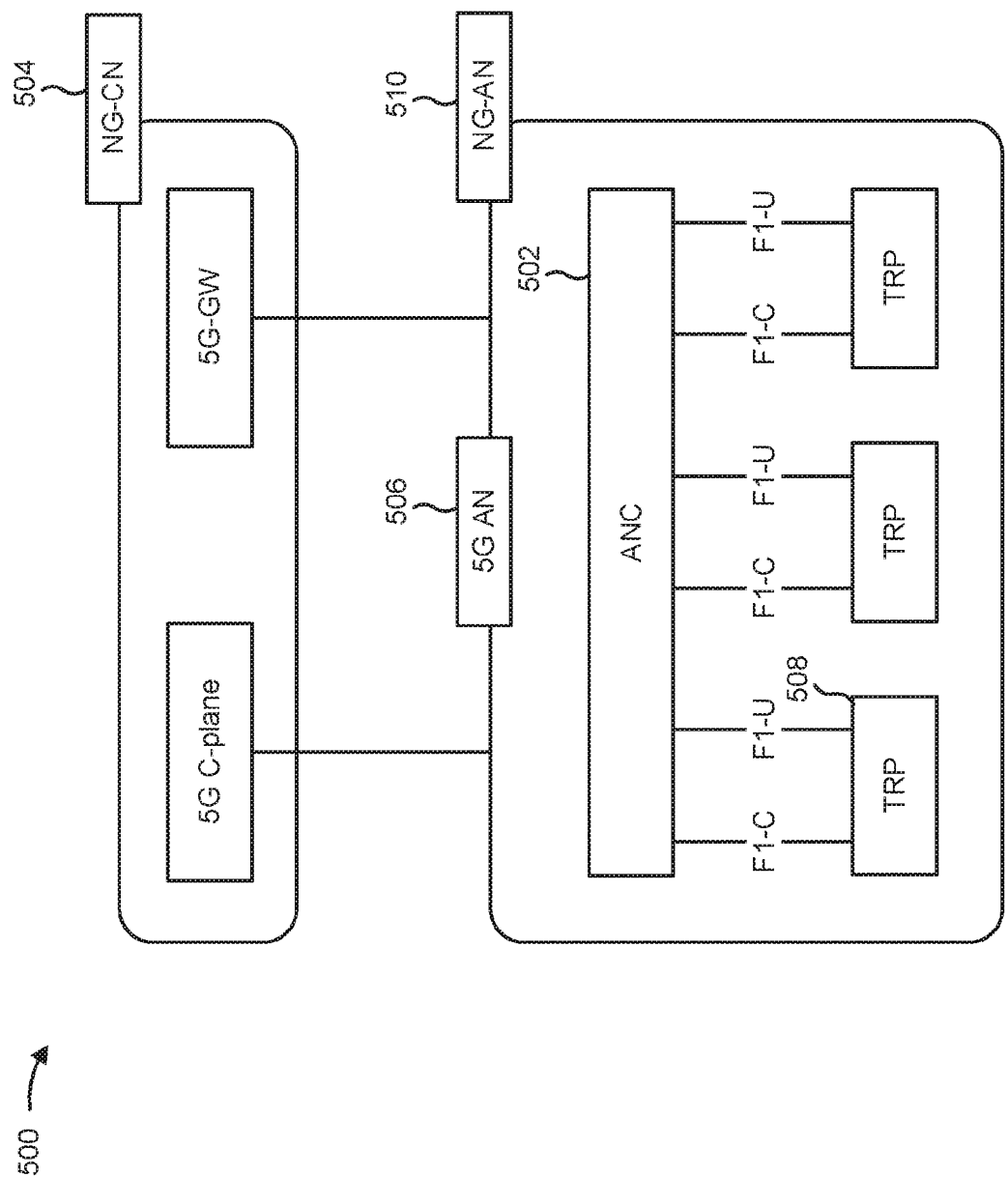
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-NaS) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
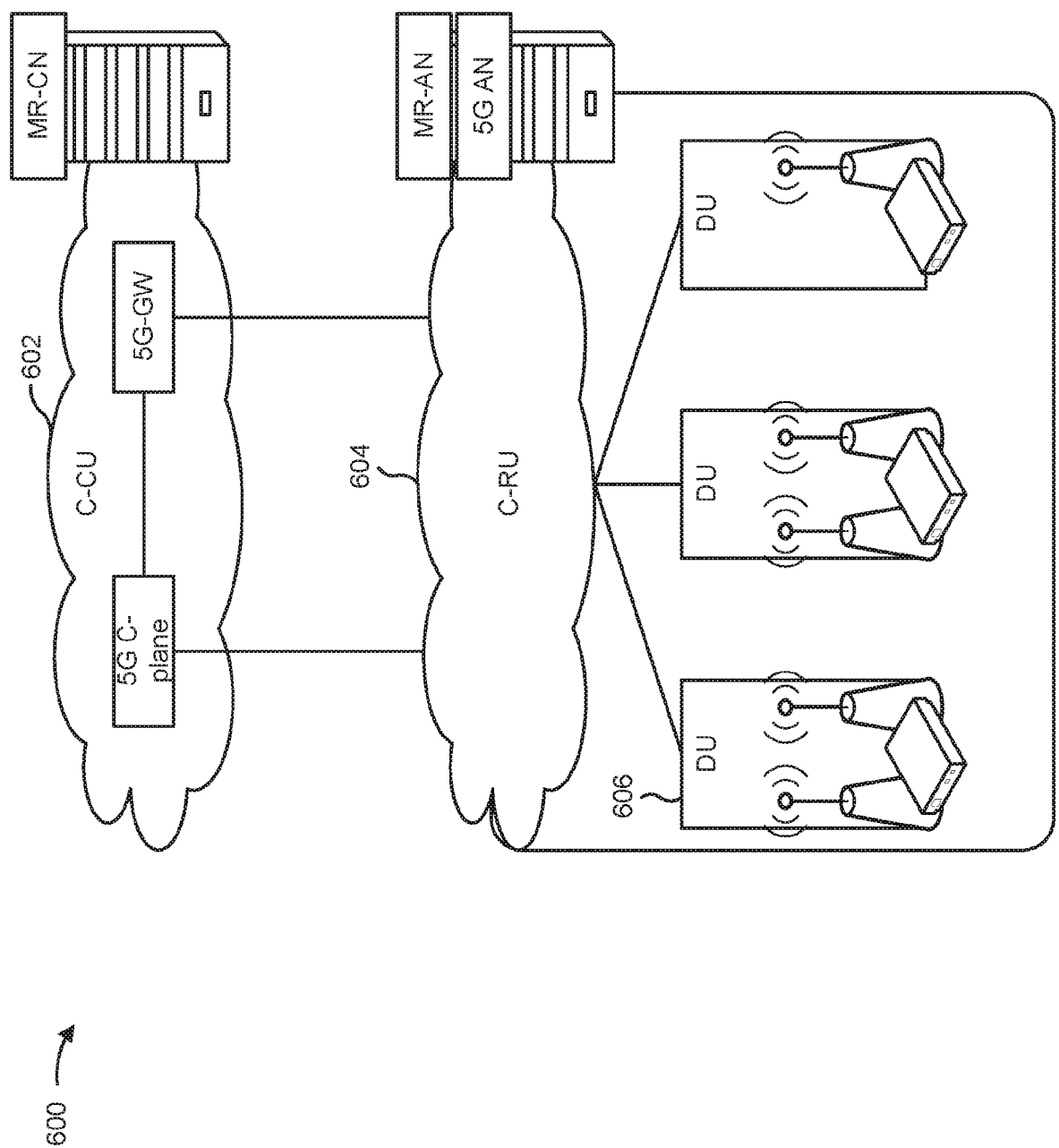
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

In most scenarios, a downlink signal of a base station is only observable within and around the edges of coverage areas of cells provided by the base station. In some scenarios, however, the downlink signal of the base station may propagate far beyond the coverage area (e.g., by tens of kilometers, hundreds of kilometers, etc.) as a result of atmospheric ducting; reflections by mountains, the ocean surface, or clouds; and/or the like. In such a case, the downlink signal of the base station may create interference for another base station, which may be termed a remote interference condition or a remote interference management scenario. The base station that transmits the downlink signal may be referred to as an aggressor base station and the base station that receives the downlink signal may be referred to as a victim base station. In some cases, interference may be reciprocal, such that a first base station is an aggressor to a second base station (which is thus a victim), and the second base station is an aggressor to the first base station (which is thus a victim). In some cases, a plurality of base stations may be aggressors and/or victims. For example, communications of a victim base station may be interfered with by transmissions from a plurality of aggressor base stations.

One situation where a remote interference condition may occur is when the aggressor base station and the victim base station have the same time division duplexing (TDD) configuration. This may occur because the aggressor base station and the victim base station are far apart, so normal interference countermeasures (e.g., different TDD configurations, gaps, etc.) do not take into account both the victim base station and the aggressor base station. A downlink signal of the aggressor base station, with the propagation delay between the aggressor base station and the victim base station, may overlap into an uplink portion of the victim base station's frame configuration. This may cause interference between the downlink communications detected by the victim base station and uplink communications to the victim base station.

The victim base station, the aggressor base station, and/or another device (e.g., a UE associated with the victim base station, a network device, an operation/administration/management device, etc.) may perform one or more remote interference management (RIM) operations to mitigate remote interference. In some cases, two or more devices may coordinate to perform RIM operations to mitigate remote interference. For example, the victim base station and the aggressor base station may alter respective communication configurations to reduce a likelihood of overlap between downlink transmissions of the aggressor base station and uplink transmissions of the victim base station. Similarly, the aggressor base station may alter a transmit power, a transmit angle, and/or the like to reduce a likelihood that transmissions of the aggressor base station interfere with communications of the victim base station, and the victim base station may alter a gain value, a receive angle, and/or the like to reduce a likelihood of receiving transmissions of the aggressor base station. Base stations may transmit reference signals to enable measurement of channel conditions, to measure interference, and/or to indicate that an interference condition is detected, which may enable the base stations to determine a RIM operation that may be successful in mitigating remote interference.

In some cases, a victim base station may define a set of reference signals, such that each reference signal is associated with a different frequency domain, time domain, and/or code domain. For example, a victim base station may transmit a reference signal defined for and using a particular sub-band of a plurality of sub-bands. In this case, the aggressor base station may determine the particular sub-band based at least part on, for example, an index of the reference signal, and may block transmission on the particular sub-band thereby eliminating an interference condition. However, in some cases, as a result of bandwidth overlapping, interference may span across a plurality of sub-bands. As a result, when the victim base station transmits the reference signal using the particular sub-band, the aggressor base station may fail to determine that the remote interference condition affects one or more other sub-bands, and may fail to block transmission on the one or more other sub-bands, thereby resulting in a continuance of the remote interference condition. Further, interference may be aligned to a portion of the particular sub-band, rather than a whole bandwidth of the particular sub-band. In this case, when the aggressor base station blocks transmission on the whole bandwidth of the particular sub-band, a utilization of network resources may be inefficient.

Some aspects, described herein, may provide for reference signal transmission in a remote interference management (RIM) scenario. For example, a victim base station may detect interference in a set of sub-bands (e.g., in a single sub-band, in a portion of a single sub-band, in a plurality of sub-bands, in portions of a plurality of sub-bands, and/or the like), and may transmit a set of reference signals (e.g., a single reference signal, a plurality of reference signals, and/or the like) to indicate the set of sub-bands. In this way, the victim base station may identify the set of sub-bands in which interference is detected, thereby enabling an aggressor base station to block transmission in the set of sub-bands. In this way, the victim base station reduces a likelihood of and/or a length of an interference condition relative to transmitting a single reference signal to identify a single sub-band. Moreover, the victim base station improves a utilization of network resources by enabling an aggressor base station to block a first portion of a sub-band in which interference is detected and to continue transmitting using a second portion of the same sub-band in which interference is not detected.

Figure 7:
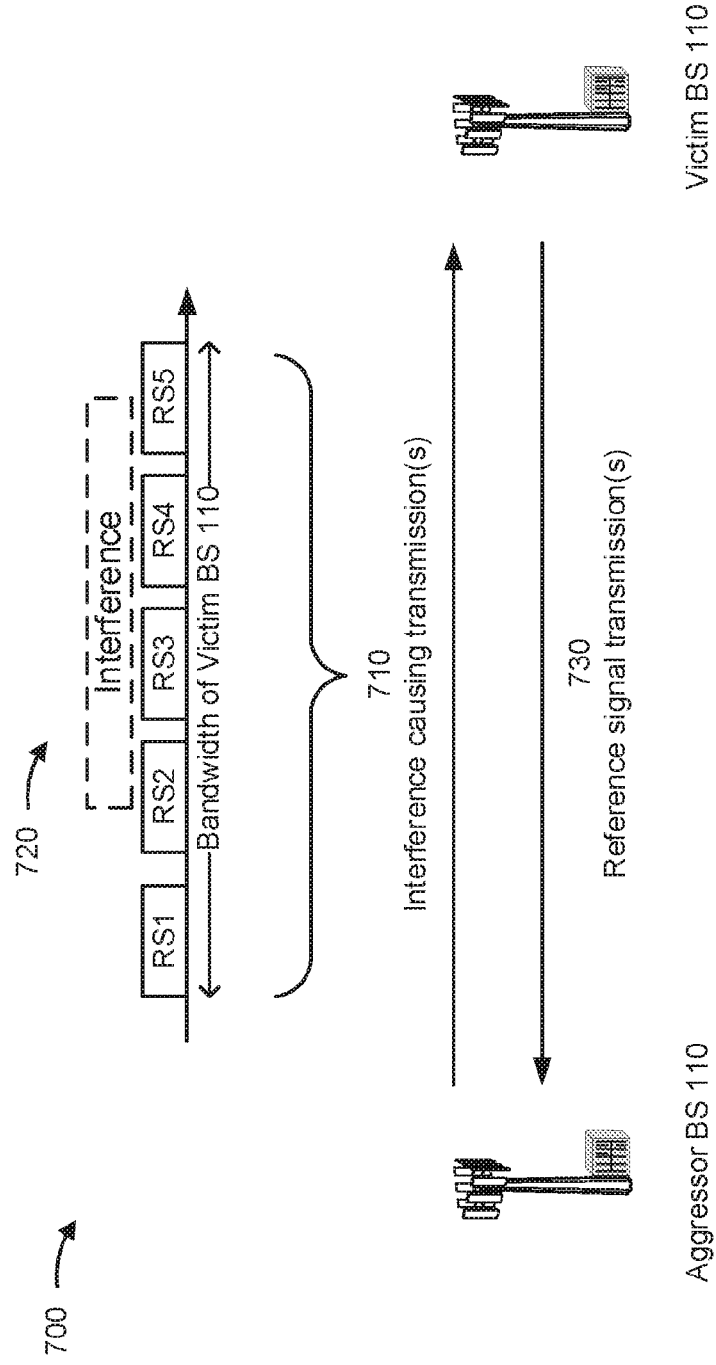
FIG. 7 is a diagram illustrating an example of reference signal transmission in a remote interference management scenario, in accordance with various aspects of the present disclosure.

FIG. 7 is a diagram illustrating an example 700 of reference signal transmission in a remote interference management scenario, in accordance with various aspects of the present disclosure. As shown in FIG. 7, example 700 includes an aggressor BS 110 and a victim BS 110.

As further shown in FIG. 7, and by reference number 710, victim BS 110 may detect one or more interference causing transmissions from aggressor BS 110. For example, aggressor BS 110 may transmit one or more transmissions that may interfere with transmissions to and/or by victim BS 110 in a remote interference management (RIM) scenario. In some aspects, victim BS 110 may detect remote interference associated with one or more sub-bands of a plurality of sub-bands of a bandwidth. For example, in a remote interference condition shown by reference number 720, victim BS 110 may be associated with a 100 megahertz (MHz) bandwidth divided into a set of 5 sub-bands of 20 MHz each corresponding to a set of 5 reference signals shown as RS1, RS2, RS3, RS4, and RS5. In this case, victim BS 110 may detect no interference in a first sub-band (corresponding to RS1), and may detect the interference in a portion of a second sub-band (corresponding to RS2), in all of a third sub-band (corresponding to RS3) and all of a fourth sub-band (corresponding to RS4), and in a portion of a fifth sub-band (corresponding to RS5). In other examples of remote interference conditions, victim BS 110 may detect interference in all or in a portion of one or more sub-bands (e.g., in all of one or more sub-bands, in a portion of one or more sub-bands, in all of one or more sub-bands and in a portion of one or more other sub-bands, and/or the like). Although some aspects, described herein, are described in terms of a particular quantity and/or arrangement of reference signals and/or sub-bands, other quantities and/or arrangements may be possible.

As further shown in FIG. 7, and by reference number 730, victim BS 110 may transmit one or more reference signals to aggressor BS 110 to trigger a RIM operation (e.g., by aggressor BS 110, by victim BS 110, and/or the like). For example, with regard to the interference condition shown by reference number 720, victim BS 110 may transmit a set of 4 reference signals (e.g., RS2, RS3, RS4, and RS5) at a single time in a single reference signal transmission cycle to indicate the interference occurring in the second sub-band, the third sub-band, the fourth sub-band, and the fifth sub-band. In this case, victim BS 110 may transmit the reference signals to map to all interfered sub-bands. In this way, victim BS 110 reduces interference relative to transmitting a single reference signal to identify a single sub-band in which interference is occurring. Additionally, or alternatively, victim BS 110 may transmit RS2, RS3, RS4, and RS5, in a single reference signal cycle at 4 different times (e.g., using time hopping), such that a single reference signal is transmitted at a time. In this case, victim BS 110 may transmit the reference signals to map to partial interfered sub-bands, thereby improving a utilization of network resources.

In some aspects, victim BS 110 may transmit a single reference signal. For example, in a RIM scenario with remote interference detected in the second sub-band and the third sub-band, BS 110 may transmit a single reference signal to indicate both the second sub-band and the third sub-band, thereby reducing a utilization of network resources relative to transmitting a plurality of reference signals while enabling blocking of transmissions at a plurality of sub-bands. In some aspects, victim BS 110 may configure a parameter of a reference signal to indicate a plurality of sub-bands. For example, victim BS 110 may transmit a reference signal (e.g., RS2) with a particular frequency index to identify the second sub-band, a particular sequence index or time pattern to identify the third sub-band, and/or the like. In this case, aggressor BS 110 may determine the parameters of the reference signal to determine that the reference signal is to indicate interference in the second sub-band and the third sub-band.

In some aspects, victim BS 110 may transmit a reference signal to indicate the RIM scenario, and may trigger subsequent communications to identify one or more sub-bands. For example, victim BS 110 may transmit a reference signal that includes identification information (e.g., a cell identifier) to enable aggressor BS 110 and victim BS 110 to establish a backhaul connection to communicate regarding which sub-bands remote interference is detected. In some aspects, victim BS 110 may transmit a narrowband reference signal. For example, victim BS 110 may transmit a reference signal that is associated with a reduced frequency domain, a shortened sequence, an extended time pattern, and/or the like relative to other reference signals to indicate interference in one or more sub-bands. In some aspects, victim BS 110 may transmit repetitions of a reference signal. In some aspects, victim BS 110 may transmit an assistance reference signal. For example, victim BS 110 may transmit RS3 to indicate the third sub-band is interfered with based at least in part on a frequency index and that the second sub-band is interfered with based at least in part on a sequence index, and may cause aggressor BS 110 to establish a backhaul connection, with which victim BS 110 may indicate interference in the fourth sub-band and the fifth sub-band.

Although some aspects, described herein, are described in terms of a victim BS 110 transmitting a reference signal to an aggressor BS 110, an aggressor BS 110 may transmit a reference signal to a victim BS 110, and may configure the reference signal to identify a set of sub-bands in which interference is detected.

As indicated above, FIG. 7 is provided as an example. Other examples are possible and may differ from what was described with respect to FIG. 7.

FIG. 8 is a diagram illustrating an example process 800 performed, for example, by a base station, in accordance with various aspects of the present disclosure. Example process 800 is an example where a base station (e.g., BS 110) performs reference signal transmission in a remote interference management scenario.

As shown in FIG. 8, in some aspects, process 800 may include detecting interference, in a remote interference management (RIM) scenario, in a set of sub-bands of a plurality of sub-bands of a bandwidth portion (block 810). For example, the base station (e.g., using antenna 234, DEMOD 232, MEMO detector 236, receive processor 238, controller/processor 240, and/or the like) may detect interference, in a RIM scenario, in a set of sub-bands of a plurality of sub-bands of a bandwidth portion, as described in more detail above.

As shown in FIG. 8, in some aspects, process 800 may include transmitting, to identify the set of sub-bands in which interference is detected, a set of reference signals configured to indicate the set of sub-bands in which the interference is detected (block 820). For example, the base station (e.g., controller/processor 240, transmit processor 220, TX MIMO processor 230, MOD 232, antenna 234, and/or the like) may transmit, to identify the set of sub-bands in which interference is detected, a set of reference signals configured to indicate the set of sub-bands in which the interference is detected, as described in more detail above.

Process 800 may include additional aspects, such as any single aspect or any combination of aspects described below and/or in connection with one or more other processes described elsewhere herein.

In some aspects, the set of reference signals is a plurality of reference signals. In some aspects, the base station is configured to transmit the set of reference signals using the set of sub-bands at a single time period of a single reference signal transmission cycle. In some aspects, the base station is configured to transmit the set of reference signals using the set of sub-bands at a plurality of time periods of a single reference signal transmission cycle.

In some aspects, the set of reference signals identifies a fully interfered sub-band of the set of sub-bands. In some aspects, the set of reference signals identifies a partially interfered sub-band of the set of sub-bands. In some aspects, the set of sub-bands is at least a portion of two or more sub-bands.

In some aspects, the set of reference signals is a single reference signal. In some aspects, a single reference signal, of the set of reference signals, identifies two or more sub-bands of the set of sub-bands. In some aspects, a frequency index of a reference signal, of the set of reference signals, identifies a sub-band of the set of sub-bands.

In some aspects, a sequence index or a time pattern of a reference signal, of the set of reference signals, identifies a sub-band of the set of sub-bands. In some aspects, the base station is a victim base station and is configured to communicate, using a backhaul connection, with an aggressor base station associated with the interference to identify the set of sub-bands. In some aspects, a reference signal, of the set of reference signals, indicates identification information associated with establishing a backhaul communication with another base station.

In some aspects, a reference signal, of the set of reference signals, is a narrowband reference signal with repetition in a sub-band of the set of sub-bands. In some aspects, a reference signal, of the set of reference signals, is associated with, relative to other reference signals, at least one of: a shortened sequence, or an extended time pattern. In some aspects, a reference signal, of the set of reference signals, is an assistance reference signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node, comprising:
    detecting interference, in a remote interference management (RIM) scenario, in a set of at least two sub-bands of a plurality of sub-bands of a bandwidth portion; and transmitting, to identify the set of at least two sub-bands in which interference is detected, a set of reference signals configured to indicate the set of at least two sub-bands in which the interference is detected,
   wherein the set of reference signals includes at least two reference signals, and
   wherein at least one of the reference signals in the set of reference signals identifies a partially interfered sub-band of the set of sub-bands.

2. The method of claim 1, wherein each reference signal in the set of reference signals corresponds to one of the at least two sub-bands in which interference is detected.

3. The method of claim 1, wherein the network node is configured to transmit the set of reference signals using the set of sub-bands at a single time period of a single reference signal transmission cycle.

4. The method of claim 1, wherein the network node is configured to transmit the set of reference signals using the set of sub-bands at a plurality of time periods of a single reference signal transmission cycle.

5. The method of claim 1, wherein the set of reference signals further identifies a fully interfered sub-band of the set of sub-bands.

6. The method of claim 1, wherein the set of at least two sub-bands is at least a portion of two or more sub-bands.

7. The method of claim 1, wherein a single reference signal, of the set of reference signals, identifies two or more sub-bands of the set of sub-bands.

8. The method of claim 1, wherein a frequency index of a reference signal, of the set of reference signals, identifies a sub-band of the set of sub-bands.

9. The method of claim 1, wherein a sequence index or a time pattern of a reference signal, of the set of reference signals, identifies a sub-band of the set of sub-bands.

10. The method of claim 1, wherein the network node is a victim network node, and
   wherein the method further comprises:
      communicating, using a backhaul connection, with an aggressor network node associated with the interference to identify the set of sub-bands.

11. The method of claim 1, wherein a reference signal, of the set of reference signals, indicates identification information associated with establishing a backhaul communication with another network node.

12. The method of claim 1, wherein a reference signal, of the set of reference signals, is a narrowband reference signal with repetition in a sub-band of the set of sub-bands.

13. The method of claim 1, wherein a reference signal, of the set of reference signals, is associated with, relative to other reference signals, at least one of:
   a shortened sequence, or
   an extended time pattern.

14. The method of claim 1, wherein a reference signal, of the set of reference signals, is an assistance reference signal.

15. The method of claim 1, further comprising:
   transmitting one or more reference signals to trigger the RIM scenario.

16. A network node for wireless communication, comprising:
   a memory; and
   one or more processors coupled to the memory, the one or more processors configured to:
      detect interference, in a remote interference management (RIM) scenario, in a set of at least two sub-bands of a plurality of sub-bands of a bandwidth portion; and
      transmit, to identify the set of at least two sub-bands in which interference is detected, a set of reference signals configured to indicate the set of sub-bands in which the interference is detected,
         wherein the set of reference signals includes at least two reference signals, and
         wherein at least one of the reference signals of the set of reference signals identifies a partially interfered sub-band of the set of sub-bands.

17. The network node of claim 16, wherein each reference signal in the set of reference signals corresponds to one of the at least two sub-bands in which interference is detected.

18. The network node of claim 16, wherein the set of reference signals is transmitted using the set of sub-bands at a single time period of a single reference signal transmission cycle.

19. The network node of claim 16, wherein the set of reference signals is transmitted using the set of sub-bands at a plurality of time periods of a single reference signal transmission cycle.

20. The network node of claim 16, wherein at least one reference signal in the set of reference signals identifies a fully interfered sub-band of the set of at least two sub-bands.

21. The network node of claim 16, wherein the set of sub-bands is at least a portion of two or more sub-bands.

22. The network node of claim 16, wherein a single reference signal, of the set of reference signals, identifies two or more sub-bands of the set of sub-bands.

23. The network node of claim 16, wherein a frequency index of a reference signal, of the set of reference signals, identifies a sub-band of the set of sub-bands.

24. The network node of claim 16, wherein a sequence index or a time pattern of a reference signal, of the set of reference signals, identifies a sub-band of the set of sub-bands.

25. The network node of claim 16, wherein the network node is a victim network node, and wherein the one or more processors are further configured to:
   communicate, using a backhaul connection, with an aggressor network node associated with the interference to identify the set of sub-bands.

26. The network node of claim 16, wherein a reference signal, of the set of reference signals, indicates identification information associated with establishing a backhaul communication with another network node.

27. The network node of claim 16, wherein a reference signal, of the set of reference signals, is a narrowband reference signal with repetition in a sub-band of the set of sub-bands.

28. The network node of claim 16, wherein a reference signal, of the set of reference signals, is associated with, relative to other reference signals, at least one of:
   a shortened sequence, or
   an extended time pattern.

29. The network node of claim 16, wherein a reference signal, of the set of reference signals, is an assistance reference signal.

30. The network node of claim 16, wherein the one or more processors are further configured to:
   transmit one or more reference signals to trigger the RIM scenario.

31. A non-transitory computer-readable medium storing one or more instructions for wireless communication, the one or more instructions comprising:
   one or more instructions that, when executed by one or more processors of a network node, cause the one or more processors to:

detect interference, in a remote interference management (RIM) scenario, in a set of at least two sub-bands of a plurality of sub-bands of a bandwidth portion; and transmit, to identify the set of at least two sub-bands in which interference is detected, a set of reference signals configured to indicate the set of sub-bands in which the interference is detected, wherein the set of reference signals includes at least two reference signals, and wherein at least one of the reference signals of the set of reference signals identifies a partially interfered sub-band of the set of sub-bands.

32. The non-transitory computer-readable medium of claim 31, wherein the set of reference signals is transmitted using the set of sub-bands at a single time period of a single reference signal transmission cycle.

33. The non-transitory computer-readable medium of claim 31, wherein the set of reference signals is transmitted using the set of sub-bands at a plurality of time periods of a single reference signal transmission cycle.

34. The non-transitory computer-readable medium of claim 31, wherein the set of reference signals further identifies a fully interfered sub-band of the set of sub-bands.

35. The non-transitory computer-readable medium of claim 31, wherein the set of at least two sub-bands is at least a portion of two or more sub-bands.

36. The non-transitory computer-readable medium of claim 31, wherein a single reference signal, of the set of reference signals, identifies two or more sub-bands of the set of sub-bands.

37. The non-transitory computer-readable medium of claim 31, wherein a frequency index of a reference signal, of the set of reference signals, identifies a sub-band of the set of sub-bands.

38. The non-transitory computer-readable medium of claim 31, wherein a sequence index or a time pattern of a reference signal, of the set of reference signals, identifies a sub-band of the set of sub-bands.

39. The non-transitory computer-readable medium of claim 31, wherein the network node is a victim network node, and wherein the one or more instructions, when executed by the network node, cause the one or more processors to:

communicate, using a backhaul connection, with an aggressor network node associated with the interference to identify the set of sub-bands, wherein at least one of the reference signals of the set of reference signals identifies a partially interfered sub-band of the set of sub-bands.

40. The non-transitory computer-readable medium of claim 31, wherein a reference signal, of the set of reference signals, indicates identification information associated with establishing a backhaul communication with another network node.

41. The non-transitory computer-readable medium of claim 31, wherein a reference signal, of the set of reference signals, is a narrowband reference signal with repetition in a sub-band of the set of sub-bands.

42. The non-transitory computer-readable medium of claim 31, wherein a reference signal, of the set of reference signals, is associated with, relative to other reference signals, at least one of:

a shortened sequence, or an extended time pattern.

43. The non-transitory computer-readable medium of claim 31, wherein a reference signal, of the set of reference signals, is an assistance reference signal.

44. The non-transitory computer-readable medium of claim 31, wherein the one or more instructions, when executed by the one or more processors, further cause the one or more processors to:

transmit one or more reference signals to trigger the RIM scenario.

45. An apparatus for wireless communication, comprising:

means for detecting interference, in a remote interference management (RIM) scenario, in a set of at least two sub-bands of a plurality of sub-bands of a bandwidth portion; and means for transmitting, to identify the set of at least two sub-bands in which interference is detected, a set of reference signals configured to indicate the set of at least two sub-bands in which the interference is detected, wherein the set of reference signals includes at least two reference signals, and wherein at least one of the reference signals in the set of reference signals identifies a partially interfered sub-band of the set of sub-bands.

46. The apparatus of claim 45, wherein each reference signal in the set of reference signals corresponds to one of the at least two sub-bands in which interference is detected.

47. The apparatus of claim 45, wherein the set of reference signals is transmitted using the set of sub-bands at a single time period of a single reference signal transmission cycle.

48. The apparatus of claim 45, wherein the set of reference signals is transmitted using the set of sub-bands at a plurality of time periods of a single reference signal transmission cycle.

49. The apparatus of claim 45, wherein at least one reference signal of the set of reference signals further identifies a fully interfered sub-band of the set of sub-bands.

50. The apparatus of claim 45, wherein the set of at least sub-bands is at least a portion of two or more sub-bands.

51. The apparatus of claim 45, wherein a single reference signal, of the set of reference signals, identifies two or more sub-bands of the set of sub-bands.

52. The apparatus of claim 45, wherein a frequency index of a reference signal, of the set of reference signals, identifies a sub-band of the set of sub-bands.

53. The apparatus of claim 45, wherein a sequence index or a time pattern of a reference signal, of the set of reference signals, identifies a sub-band of the set of sub-bands.

54. The apparatus of claim 45, wherein the apparatus is a victim network node, and further comprising:

means for communicating, using a backhaul connection, with an aggressor network node associated with the interference to identify the set of sub-bands.

55. The apparatus of claim 45, wherein a reference signal, of the set of reference signals, indicates identification information associated with establishing a backhaul communication with a network node.

56. The apparatus of claim 45, wherein a reference signal, of the set of reference signals, is a narrowband reference signal with repetition in a sub-band of the set of sub-bands.

57. The apparatus of claim 45, wherein a reference signal, of the set of reference signals, is associated with, relative to other reference signals, at least one of:

a shortened sequence, or an extended time pattern.

58. The apparatus of claim 45, wherein a reference signal, of the set of reference signals, is an assistance reference signal.

59. The apparatus of claim 45, further comprising:
 means for transmitting one or more reference signals to trigger the RIM scenario.

\* \* \* \* \*